April 7, 1953     P. L. GERARD     2,634,176
FLUID PRESSURE BEARING

Filed Jan. 26, 1951     2 SHEETS—SHEET 1

Inventor:-
Paul L. Gerard
by Brown & Seward
Attorneys

April 7, 1953 P. L. GERARD 2,634,176
FLUID PRESSURE BEARING
Filed Jan. 26, 1951 2 SHEETS—SHEET 2
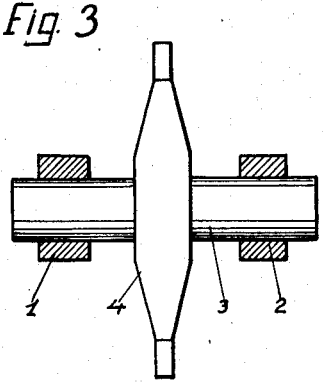
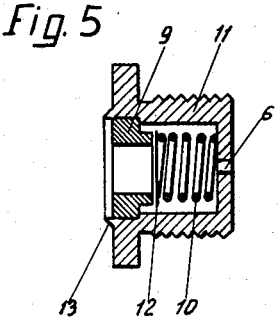
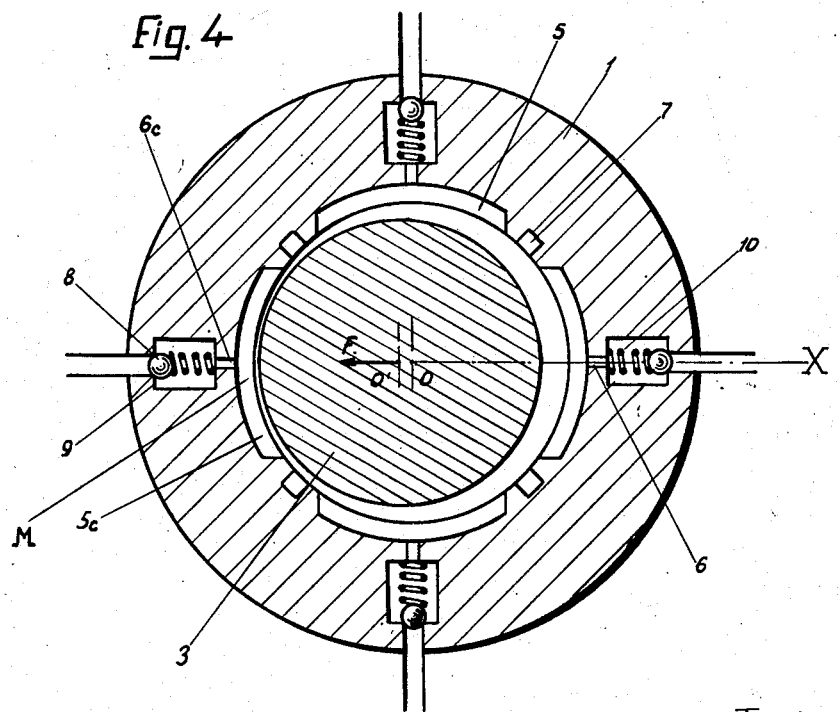
Inventor:
Paul L. Gerard
by
Brown + Seward
Attorneys Patented Apr. 7, 1953

2,634,176

UNITED STATES PATENT OFFICE 2,634,176

FLUID PRESSURE BEARING

Paul L. Gérard, Paris, France

Application January 26, 1951, Serial No. 207,869
In France January 31, 1950

4 Claims. (Cl. 308—122)

The present invention relates to bearings of the type described in patent application No. 699,051 filed on September 24, 1946, for "Improvements to Fluid Supports," in the name of Paul Gérard, now abandoned.

In bearings of this type, an annular clearance is maintained between the bearing surface and the shaft, thus held in a floating state, by means of a pressure fluid feeding a plurality of circumferentially spaced recessed portions or chambers provided in the bearing wall or in the shaft wall, longitudinal grooves through which the fluid is discharged being provided between said chambers.

In bearings of the type described, the pressure of said fluid is so determined as to provide a safety factor of about 5, for example, so that all possible dynamic effects are taken into account.

Assuming, e. g., a rotor weight of 20 kg. acting upon each bearing, such a bearing should be so designed as to provide a reaction of 100 kg. With this factor of safety, there will be no risk of accidental failure in the case of a normally balanced rotor.

In certain applications of a bearing of the type described, however, there is a risk due to unexpected causes, of the rotor being subjected to a rotating force resulting from a weight unbalance thereof. Thus, for example, in the case of a shaft journalled in bearings of the type described and carrying a turbine rotor, a blade of the rotor may be broken, which results in immediately throwing the rotor out of balance, so that the same is subjected to a considerable rotating force, the value of which is $$m\omega^2 r$$

$m$ being the mass of the detached blade,
$\omega$ the angular velocity of the rotor, and
$r$ the distance from the rotation axis to the centre of gravity of the detached mass.

Since the value of the rotating force is a function of the square of angular velocity, said force is rapidly increasing with high rotation speeds of the shaft, which are precisely to be encountered in turbines. Thus, the above mentioned rotating force may happen to exceed materially the reaction force which can be normally provided by the bearing. There is thus a risk of the shaft coming into friction contact with the bearing, which would result in a rapid wear of said shaft and bearing and even in causing serious accidents.

An object of my invention is to provide a bearing of the type described, in which all above mentioned drawbacks are overcome and, more particularly, in which the effects of any unexpected offsetting of the rotor are automatically suppressed.

Due to the very fact that the rotating force, when the rotor is out of balance, is a function of the square of the angular velocity of said rotor, it is indispensable, if the reaction is to be sufficient for any rotation speed, to take into account the nature of the rotating force.

Another object of my invention is to provide for this purpose a bearing of the type described, in which non-return valves are interposed in the feeding path of the bearing chambers, said non-return valves being so designed that in normal conditions the feeding takes place through said valves, which remain open under the action of the feeding pressure, while said valves are automatically closed, in predetermined conditions under the action of the rotating force of a shaft which has been unexpectedly offset.

I have found that, with the device according to my invention, the reaction forces developed are not only considerable, but also proportional to the square of the angular velocity of the rotor, so that, whatever may be the value of said angular velocity, the reaction forces are sufficient to balance said rotor.

Fig. 3 represents, diagrammatically, a shaft carrying a turbine rotor and journalled in two bearings;

Fig. 4 represents, in somewhat diagrammatic form, a cross-sectional view of a bearing according to the invention, the clearance and certain other dimensions being exaggerated for purposes of illustration, and Fig. 5 represents a detail axial section through a modified form of valve.

Figure 1:
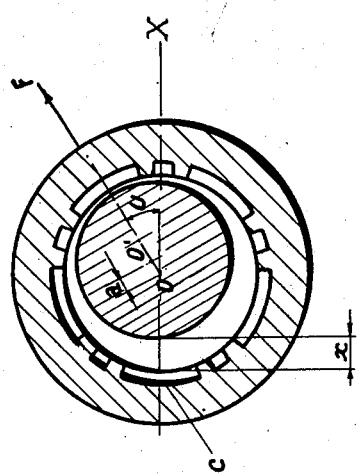
Fig. 1 represents, in diagrammatic form, a cross-sectional view of a bearing having a shaft supported therein for rotation, the clearance being greatly exaggerated for purposes of illustration.

Assume in a fluid bearing of centre O (Fig. 1), a shaft of centre O' urged by a rotating force O'F running through O. Let OX be a reference diameter, stationary with respect to the bearing. Let $U = \omega t$, be the angle FOX at a given instant, $\omega$ being the angular velocity of the shaft. Let finally $a$ be the distance between O and O', i. e. the offsetting of the shaft due to force F at said instant.

Considering a chamber $c$, having OX for its axis and the angular size of which is reasonable, it may be said that clearance $x$ in front of said chamber at a given instant, is:

$$x = b + a \cos \omega t$$

$b$ being a constant which is equal to half the diametral clearance between the shaft and the bearing. Volume V of the fluid contained in said chamber is, neglecting a constant:

$$V = Sx$$

S being the area of the chamber.
This may be re-written:

$$V = S(b + a \cos \omega t)$$

The variations of said volume V are, neglecting the sign:

$$\frac{dV}{dt} = a\omega S \sin \omega t$$

From a small value of U upwards to a value nearly amounting to 180° computations effected in well defined specific cases have shown as described hereunder that the pressure in the chamber is higher than the feeding pressure. In other words, the non-return valve through which the feeding of the chamber takes place is closed. The volume variations $$\frac{dV}{dt}$$

thus correspond to a leakage flow occurring solely through clearance $x$ between the shaft and bearing along perimeter P of the chamber.

I have found that said leakage takes place through eddy flow, i. e. its rate is proportional to the square root of $p$, $p$ being the pressure in the relevant chamber. Thus the rate of leakage at a given instant is equal to $$KP\sqrt{p}x, \text{ or } KP\sqrt{p}(b + a \cos \omega t)$$

K being a coefficient which takes into account the contraction effect as the fluid passes through the clearance, the specific mass of the fluid and the kind of units used. Since this rate of leakage is equal to the volume variation versus time, i. e.

$$\frac{dV}{dt}$$

the following equation may be written:

$$a\omega S \sin \omega t = KP\sqrt{p}(b + a \cos \omega t)$$

and thence $$\sqrt{p} = \frac{a\omega S \sin \omega t}{KP(b + a \cos \omega t)}$$

or, substituting U to $\omega t$:

$$\sqrt{p} = \frac{a\omega S \sin U}{KPB\left(1 + \frac{a}{b} \cos U\right)}$$

Coefficients P and S may be easily computed for any specific bearing.

Coefficient K is determined by choosing a well defined fluid.

Assuming a predetermined clearance between the shaft and bearing, the value of coefficient $b$ may also be determined; finally, it will be assumed that the shaft, under the action of an indefinite rotating force, rotates with a constant offsetting $a$. It is thus clear that, for each value of angle U, the pressure is proportional to the square of angular velocity $\omega$.

Now, as mentioned above, the rotating force resulting from a weight unbalance of the shaft is also proportional to the square of angular velocity. Therefore, whatever may be the rotation speed, the reaction offered by the bearing remains proportional to the rotating force, without any variation of the shaft offsetting under the action of said rotating force.

A specific example is given hereunder as an illustration.

Let the diametral clearance between the shaft and bearing be 40 $\mu$,

The shaft offsetting under the action of the rotating force 10 $\mu$,

The rotation speed of the shaft 40,000 R. P. M.,

The inner diameter of the chamber 30 mm. and the pressure of the feeding fluid (water) 1 kg./cm.$^2$.

Figure 2:
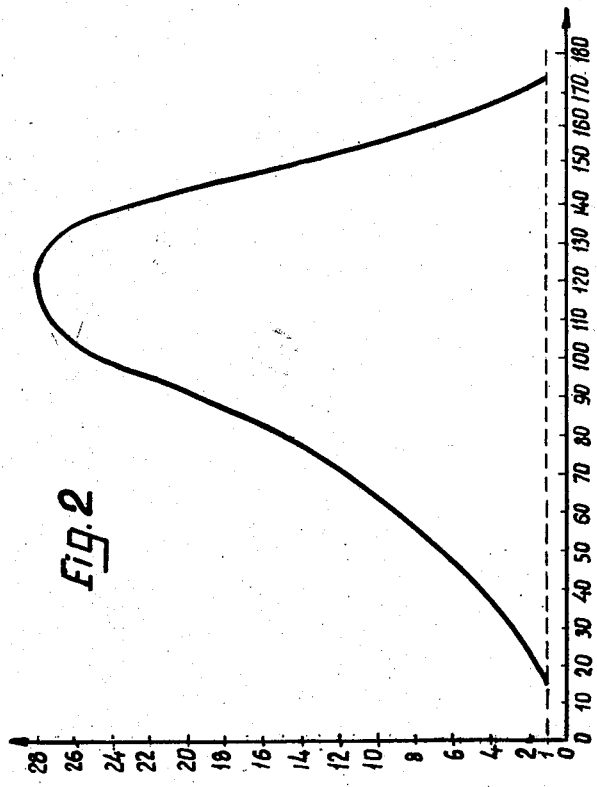
Fig. 2 represents a curve of pressure variations in function of the angle of inclination of the rotating force to the bearing axis.

In Fig. 2 is plotted a curve of the variations of pressure $p$ in the chamber, versus angle U by which the rotating force is inclined on axis OX of the bearing. It is to be noted that:

$p = 1$ kg./cm.$^2$ for
$U =$ about 19° (closing of the valve) and for
$U =$ about 174° (re-opening of the valve).

On the other hand, $p$ is a maximum for $U = 120°$ and reaches then a value of about 28 kg./cm.$^2$.

Assuming that in normal running conditions, the bearing is capable of generating a pressure equal to half the feeding pressure, which is 1 kg./cm.$^2$, it will be seen that the maximum overpressure to be generated by the bearing, when vibrating, reaches, thanks to my invention, about 50 times the normal pressure.

Referring to these drawings, there are shown at 1 and 2, two bearings in which is journalled a shaft 3 carrying the rotor 4 of a turbine.

Bearing 1 is shown in detail in Fig. 4. In the example shown, this bearing comprises four feeding chambers 5, fed with a pressure fluid through throttlings 6, and separated by grooves 7, adapted to discharge the fluid escaping from said chambers 5 into a low pressure space.

The centre of the bearing is shown at O. It will be assumed that shaft 3 journalled in this bearing has O' for centre and is subjected to a rotating force F as explained above. Under the action of said force, the shaft tends to come into contact with the bearing at a point M aligned with F, force F extending as shown along a diametral direction OX.

It is clear that point M rotates with F as well as with the shaft.

Observing the fluid volume in any chamber, e. g. chamber 5c of Fig. 4, it will be found that said volume is subjected to substantially sinusoidal periodical variations. Said volume is a minimum when point M corresponding to the minimum distance between the shaft and bearing is in the position shown in the drawing. Said volume is a maximum when point M is diametrically opposed to the above mentioned position. The pressure of the fluid in the chamber increases as the volume decreases and conversely. If the value of said pressure exceeds that of the feeding pressure, the fluid is forced back through throttling 6c and the maximum value of the pressure in chamber 5c is then determined by the leakage along the perimeter of the chamber into the low pressure space added with the leakage through the throttling into that space which is subjected to the feeding pressure.

If, however, there is interposed, according to the invention, in the feeding path of each chamber, a non-return valve constituted, in the example shown in Fig. 4, by a ball 8 urged towards its seat 9 by a spring 10, the maximum value of the pressure in the chamber is solely determined by the leakage along the perimeter of said chamber, any back flow towards the feeding duct being opposed by the non-return valve. As a result, the value of the pressure in chamber 5c will be materially higher than the pressure which would be experienced if the non-return valve according to the invention were omitted.

The device according to the invention operates as follows:

1. In normal operating conditions, all non-return valves are open and the feeding of the chambers takes place through the throttlings. The bearing, which operates as described in detail in the above cited patent, is capable of balancing the normal forces which are transmitted thereto from the shaft as long as said forces do not exceed a certain value.

2. In accidental operating conditions, the throttling corresponding to a given chamber feeds the same during substantially the half revolution when the shaft tends to be separated from said chamber; on the contrary, during the following half revolution, when the shaft tends to be brought closer to the chamber, the non-return valve is re-closed and the shaft is subjected to a considerable resistance.

Thus, the reaction of which the bearing is capable is several times higher than in normal running condition.

It will be easily understood that the system described above may be used with all types of chamber-and-groove bearings described in the cited patent, whether male or female and also with bearings of the type in which each chamber is fed not directly from the pressure source but through a diametrically opposed groove. In each case, to provide a bearing according to the invention, it suffices to interpose a non-return valve in the fluid intake of each feeding chamber.

In Fig. 4 the anti-return valves have been shown located upstream the throttlings. It would be possible as well to dispose said valves downstream the same. The arrangement shown in Fig. 4 is, however, to be preferred since, in normal running conditions, the fluid flowing through a valve undergoes a pressure fall $\Delta p$ corresponding to the strength of the spring.

On the other hand, the fluid undergoes another pressure fall when flowing through the throttling. The relative value of pressure fall $\Delta p$ is therefore lower when taking place upstream the throttling.

A particular object of the invention is therefore to provide a device of the type described in which the non-return valve of each feeding chamber is disposed upstream the corresponding throttling.

The spring strength has a critical value. With a spring stronger than this critical value, the pressure fall $\Delta p$ would be too considerable, which would result in an excess of feeding pressure and thence of the pumping power. Conversely, with a spring weaker than said critical value, the valve would be closed too late, particularly with an unbalanced rotor revolving at a high speed. The spring should be therefore carefully calibrated. The valve proper is preferably as light as possible.

As a specific example, at a rotation speed of about 30,000 R. P. M. with a shaft of about 30 mm. diameter, the following values have been found satisfactory: sheet-steel valve of 5.5 mm. diameter and a 0.2 mm. thick, spring strength of about 50 g.

A valve designed according to these conditions has been shown in Fig. 5. There is shown at 11 the valve body in the bore of which is housed a small plate 12 urged towards a valve-seat 9 by a spring 10. The throttling 6 is provided in the end of body 11 opposed to seat 9. Seat 9 may be secured in the bore of body 11, by soldering or crimping, e. g. by turning over a projecting edge 13.

What is claimed is:

1. In a bearing member having a bearing surface for supporting a movable element with an annular clearance space therebetween, a plurality of circumferentially spaced pressure chambers, means for separately conducting fluid under pressure into each of said pressure chambers including separate ducts, longitudinal evacuation grooves between said pressure chambers through which said fluid is discharged therefrom, and a non-return valve in each of said ducts, in close proximity to each said pressure chamber, each valve being adapted to be closed automatically whenever the fluid pressure in the corresponding pressure chamber exceeds that of the fluid conducted thereto.

2. A bearing device according to claim 1, in which each said duct includes a constricted passage and in which each said non-return valve is interposed in each said duct upstream said constricted passage.

3. A bearing device according to claim 1, in which each said valve includes an obturating member in the form of a thin sheet-metal disc.

4. A bearing device according to claim 2, in which each said valve includes an obturating member in the form of a thin sheet-metal disc.

PAUL L. GÉRARD.

REFERENCES CITED

The following references are of record in the file of this patent:

UNITED STATES PATENTS

| Number | Name | Date |
|---|---|---|
| 1,906,715 | Penick | May 2, 1933 |
| 2,254,670 | Turner | Sept. 2, 1941 |
| 2,495,516 | Foster | Jan. 24, 1950 |